(12) United States Patent
Yamazaki et al.

(10) Patent No.: US 12,198,436 B2
(45) Date of Patent: Jan. 14, 2025

(54) DISPLAY SYSTEM, DISPLAY PROCESSING METHOD, AND NONTRANSITORY COMPUTER-READABLE STORAGE MEDIUM

(71) Applicant: NEC Corporation, Tokyo (JP)

(72) Inventors: Daiki Yamazaki, Tokyo (JP); Ryuji Wakakusa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 196 days.

(21) Appl. No.: 17/788,837

(22) PCT Filed: Dec. 27, 2019

(86) PCT No.: PCT/JP2019/051545
§ 371 (c)(1),
(2) Date: Jun. 24, 2022

(87) PCT Pub. No.: WO2021/131050
PCT Pub. Date: Jul. 1, 2021

(65) Prior Publication Data
US 2023/0025590 A1    Jan. 26, 2023

(51) Int. Cl.
G06F 3/14      (2006.01)
G06T 7/20      (2017.01)
G06V 10/60     (2022.01)
G06V 20/52     (2022.01)
G09G 5/00      (2006.01)
H04N 7/18      (2006.01)

(52) U.S. Cl.
CPC .............. *G06V 20/52* (2022.01); *G06F 3/14* (2013.01); *G06T 7/20* (2013.01); *G06V 10/60* (2022.01); *G09G 5/00* (2013.01); *G06T 2207/30196* (2013.01); *G06T 2207/30242* (2013.01); *G06V 2201/07* (2022.01)

(58) Field of Classification Search
None
See application file for complete search history.

(56) References Cited

U.S. PATENT DOCUMENTS

2010/0309004 A1* 12/2010 Grundler ................ G08B 7/066
                                                      340/588
2013/0271667 A1  10/2013 Tojo
2015/0262489 A1*  9/2015 Sun ........................ G08G 1/095
                                                      348/149
(Continued)

FOREIGN PATENT DOCUMENTS

JP   H07-296068 A    11/1995
JP   2003-063746 A    3/2003
JP   2003-317168 A   11/2003
(Continued)

OTHER PUBLICATIONS

English machine-translated copy of JP 2004310208A, 8 pages. (Year: 2004).*

(Continued)

*Primary Examiner* — Hung Q Dang

(57) ABSTRACT

A display system (1) includes a display (D1) installed on a first road (R1) and a camera (C1) for capturing an image of a second road (R2) being narrower than the first road (R1), in which the display (D1) acquires and displays an image generated by the camera (C1) or a display data using the image.

18 Claims, 18 Drawing Sheets

(56) References Cited

U.S. PATENT DOCUMENTS

2017/0061258 A1     3/2017   Chen et al.
2020/0162735 A1*   5/2020   Ueno ................... H04N 19/124

FOREIGN PATENT DOCUMENTS

| JP | 2004-272507 A | 9/2004 |
| --- | --- | --- |
| JP | 2004-310208 A | 11/2004 |
| JP | 2007-261722 A | 10/2007 |
| JP | 2009-134488 A | 6/2009 |
| JP | 2011029754 A | 2/2011 |
| JP | 2014-197405 A | 10/2014 |
| JP | 2015-41820 A | 3/2015 |
| JP | 2015-203881 A | 11/2015 |
| JP | 2017-138678 A | 8/2017 |
| JP | 2018-067093 A | 4/2018 |
| JP | 2018-067295 A | 4/2018 |

OTHER PUBLICATIONS

IN Office Action for IN Application No. 202217036155, mailed on Nov. 28, 2022 with English Translation.
International Search Report for PCT Application No. PCT/JP2019/051545, mailed on Mar. 17, 2020.
Japanese Office Action dated Jun. 20, 2023 in Japanese Application No. 2021-566750.

* cited by examiner

1

DISPLAY SYSTEM, DISPLAY PROCESSING METHOD, AND NONTRANSITORY COMPUTER-READABLE STORAGE MEDIUM

This application is a National Stage Entry of PCT/JP2019/051545 filed on Dec. 27, 2019, the contents of all of which are incorporated herein by reference, in their entirety.

TECHNICAL FIELD

The present invention relates to a display system, a display processing apparatus, a display processing method, and a program.

BACKGROUND ART

In recent years, a surveillance camera is being installed in a town, and a method for improving a deterrent to crime using a security camera is desired.

As a method of using a surveillance camera, Patent Document 1 describes an evacuation guidance supporting apparatus that monitors entry of a person into a dangerous area and decides an evacuation route by effectively using an image processing technique. Further, Patent Document 2 describes a technique for displaying disaster prevention information on a large display installed in a town or the like when the disaster prevention information is broadcasted by one-segment broadcasting.

RELATED DOCUMENTS

Patent Documents

[Patent Document 1] Japanese Patent Application Publication No. H7-296068
[Patent Document 2] Japanese Patent Application Publication No. 2011-29754

SUMMARY OF THE INVENTION

Technical Problem

The above literatures describe a technique for monitoring entry into a dangerous area in a state in which a disaster has already occurred, and displaying a captured image of a place where a disaster has occurred on a large display. This enables staying away from a dangerous place where a disaster has occurred and avoiding a dangerous place during evacuation.

However, none of the above discloses a technique for preventing a criminal act.

The present invention has been made in view of the above-described circumstance, and an object of the present invention is to provide a technique for monitoring an unfrequented back alley to prevent occurrence of crime.

Solution to Problem

In each aspect of the present invention, following configurations are employed in order to solve the above-described problem.

A first aspect relates to a display system.
The display system according to the first aspect includes:
a display unit that is installed on a first road; and
an image capture unit that captures an image of a second road being narrower than the first road, wherein the display unit acquires and displays an image generated by the image capture unit or a display data using the image.

A second aspect relates to a display processing apparatus.
The display processing apparatus according to the second aspect includes
a display control unit that acquires an image generated by an image capture unit that captures an image of a second road being narrower than a first road on which a display is installed, or a display data using the image, and causes the display to display the image or the display data.

A third aspect relates to a display processing method executed by at least one computer.
The display processing method according to the third aspect includes:
by a display processing apparatus,
acquiring an image generated by image capture unit that captures an image of a second road being narrower than a first road on which a display is installed, or a display data using the image; and
causing the display to display the image or the display data.

Note that, another aspect of the present invention may be a program causing at least one computer to execute the method according to the above-described third aspect, or may be a computer-readable storage medium on which such a program is recorded. The storage medium includes a non-transitory tangible medium.

The computer program includes a computer program code causing, when executed by a computer, the computer to carry out, on a display processing apparatus, a display processing method thereof.

Note that, any combinations of the above components and conversions of expression of the present invention among a method, an apparatus, a system, a storage medium, a computer program, and the like are also effective as a mode of the present invention.

Further, the various components of the present invention are not necessarily required to exist individually and independently, and a plurality of components may be formed as one member, one component may be formed by a plurality of members, a certain component may be a part of another component, a part of a certain component may overlap with a part of another component, or the like.

Further, while a plurality of procedures are described in order in the method and the computer program according to the present invention, execution order of the plurality of procedures is not limited to the described order. Thus, when the method and the computer program according to the present invention are carried out, the order of the plurality of procedures can be changed, as far as the change does not detract from contents.

Furthermore, the plurality of procedures for the method and the computer program according to the present invention are not limited to being executed individually at different timings. Thus, another procedure may occur during execution of a certain procedure, an execution timing of a certain procedure may partly or wholly overlap with an execution timing of another procedure, or the like.

Advantageous Effects of Invention

According to each of the above-described aspects, a technique for monitoring an unfrequented back alley to prevent occurrence of crime can be provided.

BRIEF DESCRIPTION OF THE DRAWINGS

The above-described object and other objects, features, and advantageous effects become more apparent from the preferred example embodiments described below and the following accompanying drawings.

FIG. 1 is a diagram schematically illustrating an overview of a display system according to an example embodiment.

DESCRIPTION OF EMBODIMENTS

Hereinafter, example embodiments of the present invention will be described by using the drawings. Note that, a similar component is assigned with a similar reference sign throughout all the drawings, and description therefor will be omitted as appropriate.

"Acquisition" in the example embodiment includes at least one of fetching (active acquisition), by an own apparatus, data or information stored in another apparatus or storage medium and inputting (passive acquisition), to an own apparatus, data or information output from another apparatus. Examples of active acquisition include requesting or inquiring another apparatus for data or information to receive a reply therefrom, accessing another apparatus or storage medium to read out data or information therefrom, and the like. Further, examples of passive acquisition include receiving delivered (transmitted, push-notified, or the like) information, and the like. Furthermore, "acquisition" may be selectively acquiring received data or information, or may be selectively receiving delivered data or information.

First Example Embodiment

<System Overview>

Figure 1:
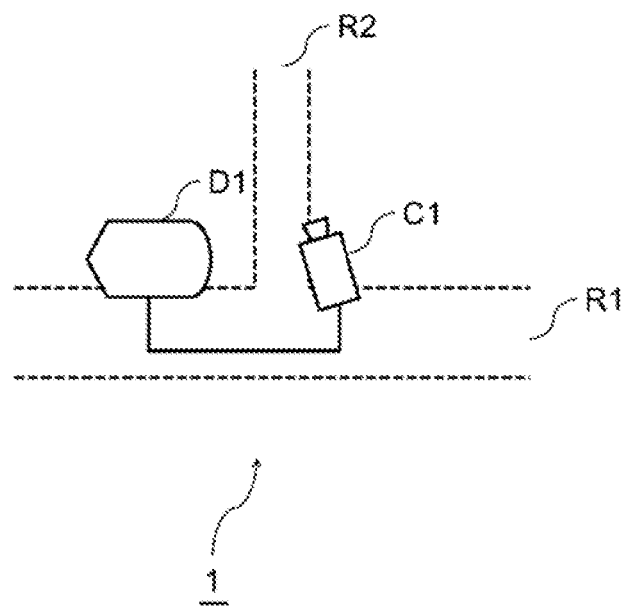

FIG. 1 is a diagram schematically illustrating an overview of a display system 1 according to an example embodiment. In each of the following figures, a road is illustrated by dashed lines. At a place where a main street (a first road R1) and an alley (a second road R2) narrower than the first road R1 are present, the display system 1 according to the present example embodiment captures an image of the second road R2 with a surveillance camera C1 and displays the captured image on a display D1 being installed on the first road R1. The display system 1 displays a captured image of an unfrequented, that is, inconspicuous back alley on the display D1 being installed on a frequented, that is, conspicuous main street, and thereby can cause people coming and going on the main street to naturally monitor a scene of the back alley.

Figure 2A:
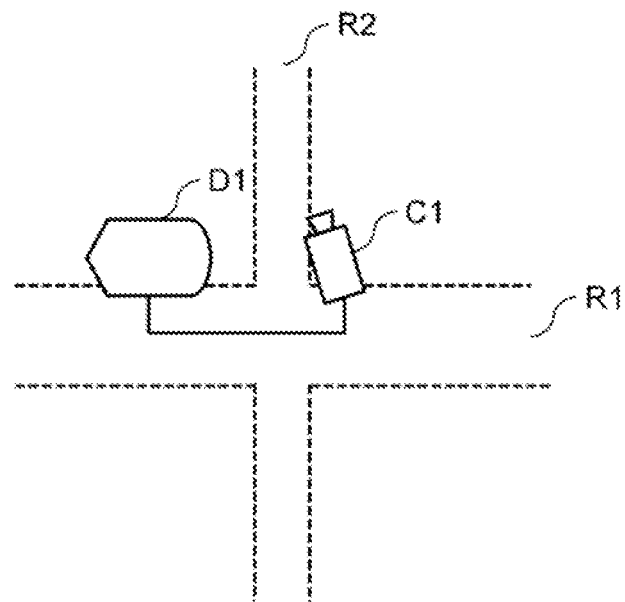
FIGS. 2A and 2B are diagrams each illustrating another example of a second road.
Figure 2B:
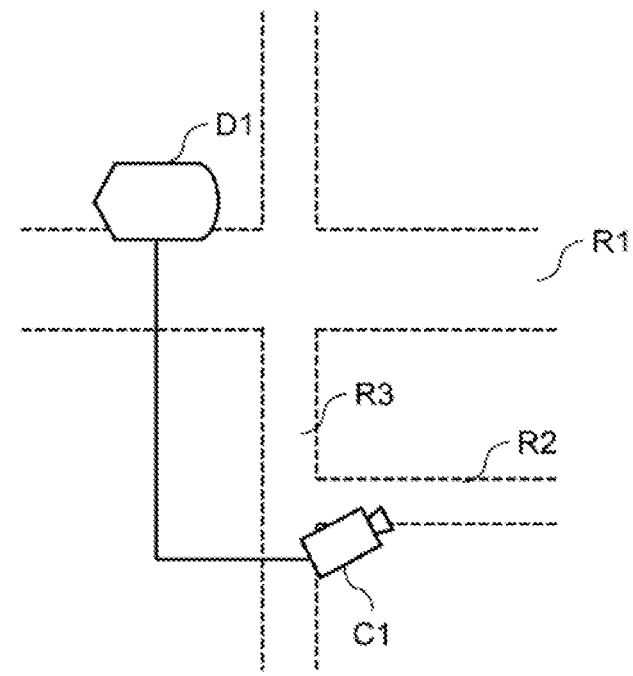

FIG. 2 is a diagram illustrating another example of the second road R2. In an example in FIG. 2A, the second road R2 intersects with the first road R1. While the single camera C1 is included in the example in FIG. 2A, a camera may be installed also on the second road R2 on an opposite side of the intersection with the first road R1 in another example. In an example in FIG. 2B, the second road R2 connects to the first road R1 via a still another third road R3.

In other words, in the example in FIG. 2A, an image capture unit 102 captures an image of the second road R2 intersecting with the first road R1. In the example in FIG. 2B, the image capture unit 102 captures an image of the second road R2 connecting to the first road R1 via the third road R3. As described above, various forms of the second road R2 on which the camera C1 is installed are conceivable and are not limited to the examples.

<Function Configuration Example>

Figure 3:
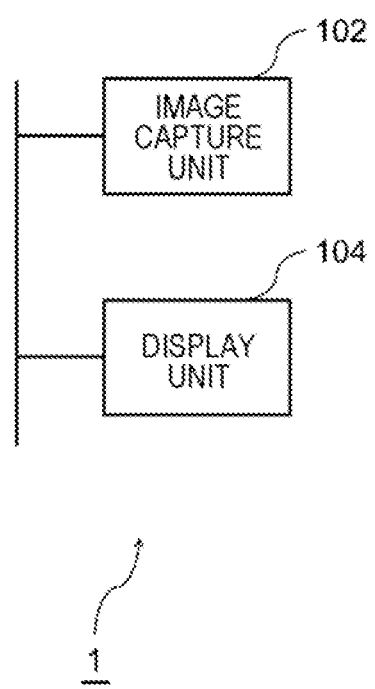
FIG. 3 is a function block diagram illustrating a logical configuration example of the display system.

FIG. 3 is a function block diagram illustrating a logical configuration example of the display system 1. The display system 1 includes the image capture unit 102 and a display unit 104.

The image capture unit 102 captures an image of the second road R2 narrower than the first road R1.

The display unit 104 is installed on the first road R1, and acquires and displays an image generated by the image capture unit 102 or a display data using the image.

The image capture unit 102 is, for example, the surveillance camera C1. The camera C1 may be a camera dedicated to the display system 1, or, for example, a surveillance camera having been previously installed on the second road R2 may be used. The camera C1 includes a lens and an image sensor such as a charge coupled device (CCD) image sensor.

The camera C1 may include a mechanism that tracks a motion of a person coming into an angle of view and performs direction control of the camera body and the lens, zoom control, focusing, and the like. The camera C1 is installed in such a way that at least the lens faces a direction for capturing an image of the second road R2 from an entrance.

An image to be generated by the camera C1 is preferably photographed in real time and transmitted to the display D1. However, an image to be transmitted to the display D1 may not be transmitted directly from the camera C1, and may be an image that is delayed by a predetermined period of time. An image captured with the camera C1 may be once stored in another storage apparatus and read out by the display D1 from the storage apparatus intermittently or at predetermined intervals. Furthermore, an image to be transmitted to the display D1 is preferably a moving image, but may be a frame image captured at predetermined intervals or may be a still image.

The display unit 104 is, for example, the display D1 such as a liquid crystal display or an organic EL display. Alternatively, the display unit 104 may be a projector device that uses a projection mapping technique to display a video on a building or a structure standing along the first road R1 or on a space. The display D1 may be a display dedicated to the display system 1, or, for example, a display having been previously installed on the first road R1 and for displaying a content such as an advertisement or notification information may be used.

An installation place of the display D1 is not particularly limited, as long as a person passing through the first road R1 can see the place. For example, the display D1 may be installed on a post provided at a median strip of the first road R1, a separator between a sidewalk and the first road R1, or the like. Alternatively, the display D1 may be attached to a sidewalk-side exterior wall of a structure built along the first road R1, or into a display window of a store.

The display D1 is preferably installed in such a way that a screen is substantially parallel to a traffic direction of the first road R1 and in such a way that the screen faces a sidewalk side, that is, in such a way that a person walking along the first road R1 can see the screen of the display D1. While FIG. 1 illustrates the single camera C1 and the single display D1, a plurality of cameras and a plurality of displays may be provided.

In the present example embodiment, the camera C1 and the display D1 are connected directly. An image captured with the camera C1 is displayed directly on the display D1. However, the camera C1 and the display D1 may be connected via a relay (not illustrated). Alternatively, as will be described in an example embodiment to be described later, the camera C1 and the display D1 may be connected via a management apparatus in a center via a network.

A scheme for connection between the camera C1 and the display D1 may be wireless or wired. In a case of wireless connection, it is assumed that the camera C1 and the display D1 each have a wireless communication function. The camera C1 may be, for example, a network camera such as an internet protocol (IP) camera.

Furthermore, an image to be displayed on the display D1 may be display data using an image generated by the camera C1. Examples of the display data may be, for example, character information, a symbol, an image, and an animation indicating a situation captured in a captured image, or character information, a symbol, an image, and an animation indicating a necessary measure based on a situation estimated from a captured image.

Figure 18:
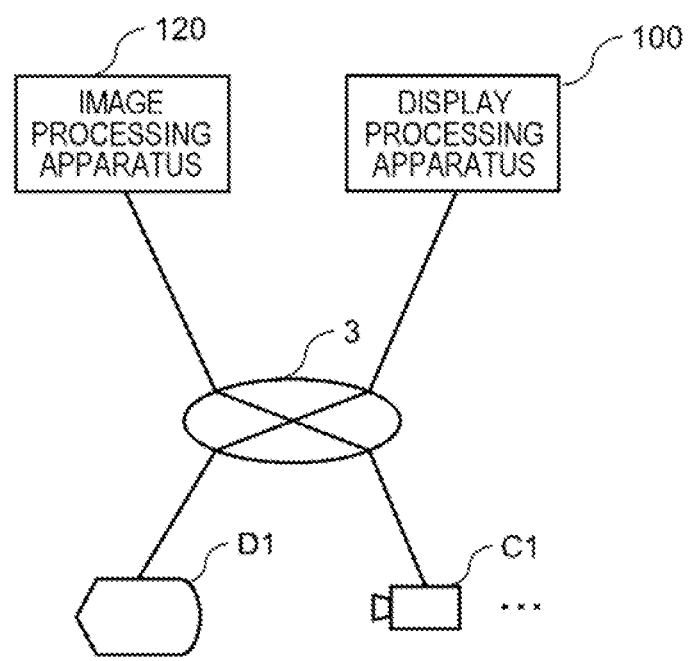
FIG. 18 is a diagram illustrating a configuration example of a display system including an image processing apparatus.

Examples of the situation captured in a captured image are, for example, a situation in which a crime is occurring, occurrence of a pickpocket or a snatch, occurrence of an assault or a fight, occurrence of terrorism, a direction of criminal's runaway, and existence of a very important person, a wanted criminal, a missing person, a lost child, a wanderer, a vagrant, or the like. For example, as illustrated in FIG. 18, a display processing apparatus 100 to be described later can analyze, by using an image processing apparatus 120, an image generated by the image capture unit 102 (the camera C1) and estimate a situation. Examples of the necessary measure based on a situation estimated from a captured image are reporting to a police or security officer, an ambulance or fire call, and evacuation guidance. The image processing apparatus 120 may be included in the display processing apparatus 100 according to an example embodiment to be described later, or may be an apparatus separate from the display processing apparatus 100.

Furthermore, the camera C1 may include a microphone (not illustrated) for inputting a voice together with an image. The display D1 may include a speaker (not illustrated) for outputting a voice. A voice input with the microphone of the camera C1 may be output from the speaker of the display D1. Furthermore, the speaker of the display D1 may output voice information or alarm sound indicating a situation captured in a captured image, voice information or alarm sound indicating a necessary measure based on a situation estimated from a captured image, or the like.

<Hardware Configuration Example>

Figure 4:
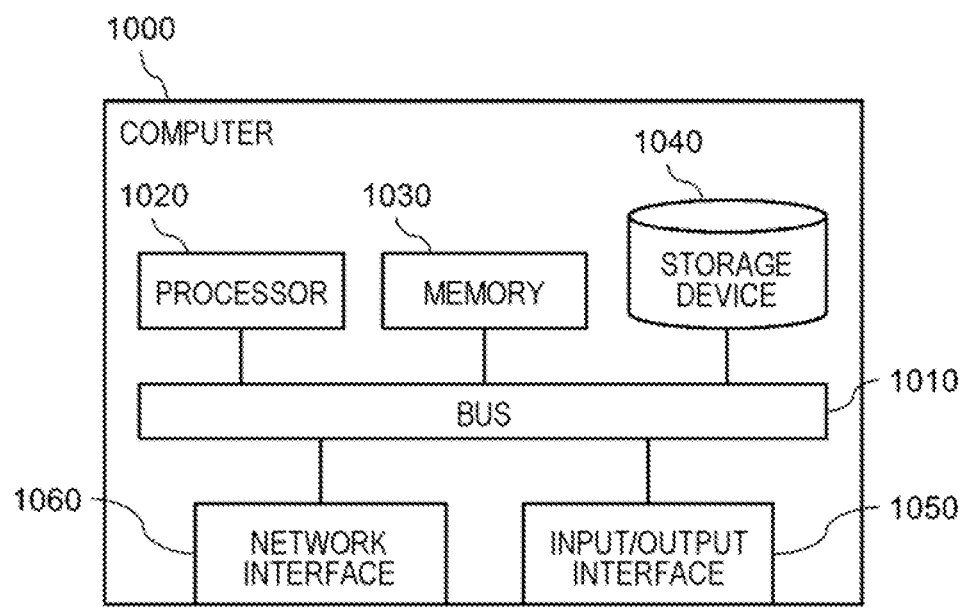
FIG. 4 is a block diagram illustrating a hardware configuration of a computer for achieving an image capture unit and a display unit of the display system illustrated in FIG. 1.

FIG. 4 is a block diagram illustrating a hardware configuration of a computer 1000 for achieving the image capture unit 102 and the display unit 104 of the display system 1 illustrated in FIG. 1. Further, the display processing apparatus 100 to be described later is also achieved by the computer 1000.

The computer 1000 includes a bus 1010, a processor 1020, a memory 1030, a storage device 1040, an input/output interface 1050, and a network interface 1060.

The bus 1010 is a data transmission path through which the processor 1020, the memory 1030, the storage device 1040, the input/output interface 1050, and the network interface 1060 transmit and receive data to and from one another. However, a method of connecting the processor 1020 and the like with one another is not limited to bus connection.

The processor 1020 is a processor achieved by a central processing unit (CPU), a graphics processing unit (GPU), or the like.

The memory 1030 is a main storage apparatus achieved by a random access memory (RAM) or the like.

The storage device 1040 is an auxiliary storage apparatus achieved by a hard disk drive (HDD), a solid state drive (SSD), a memory card, a read only memory (ROM), or the like. The storage device 1040 stores program modules for achieving the functions (for example, the image capture unit 102, the display unit 104, and a display control unit 106, a determination unit 108, an estimation unit 112, a decision unit 114, and the like of the display processing apparatus 100 to be described later) of the display system 1. Each of the program modules is read into the memory 1030 and executed by the processor 1020, and thereby each function relevant to the program module is achieved. Further, the storage device 1040 also functions as a storage unit for storing various types of information used by the display processing apparatus 100.

A program module may be recorded in a storage medium. A storage medium for recording a program module includes a medium usable by the non-transitory tangible computer 1000, and a program code readable by the computer 1000 (the processor 1020) may be embedded in the medium.

The input/output interface 1050 is an interface for connecting the computer 1000 to various types of input/output devices.

The network interface 1060 is an interface for connecting the computer 1000 to a communication network. The communication network is, for example, a local area network (LAN) or a wide area network (WAN). A method by which the network interface 1060 connects to the communication network may be wireless connection, or may be wired connection. However, the network interface 1060 may sometimes not be used.

Then, the computer 1000 connects to necessary devices (for example, the camera C1, the display D1, a speaker, a microphone, a recording device, the image processing apparatus 120, and the like) via the input/output interface 1050 or the network interface 1060.

<Operation Example>

Figure 5:
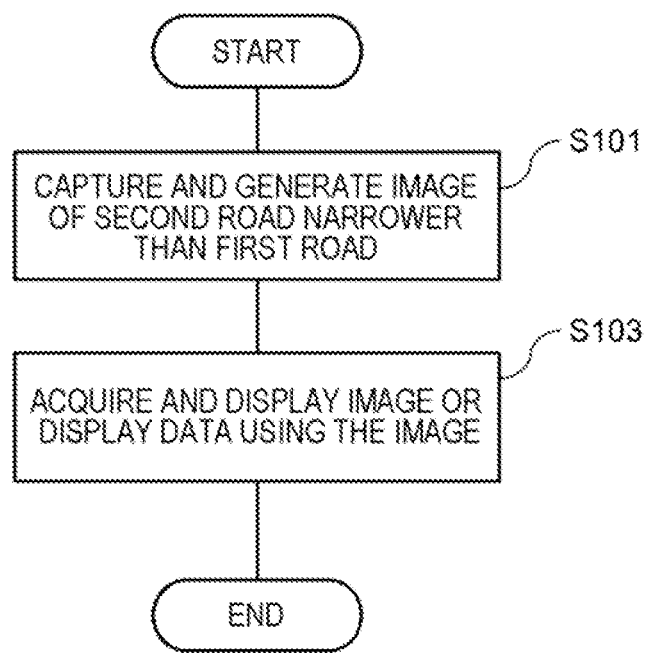
FIG. 5 is a flowchart illustrating an operation example of the display system according to the present example embodiment.

FIG. 5 is a flowchart illustrating an operation example of the display system 1 according to the present example embodiment. First, the image capture unit 102 captures and generates, by using the camera C1, an image of the second road R2 narrower than the first road R1 (Step S101). Then, the display unit 104 acquires and displays an image or a display data using the image (Step S103).

According to the present example embodiment, the image capture unit 102 captures and generates an image of the second road R2 narrower than the first road R1, and the display unit 104 acquires and displays the image or display data using the image, and thus, a situation of the second road R2 can be presented to a person on the first road R1. In other words, an image of an unfrequented back alley can be presented to a person on a main street by displaying the image of the back alley on the display D1 installed on the main street, and thus, the back alley can be monitored by the person on the main street.

Displaying an image of a back alley on a main street has a deterrent effect on crime on the back alley. Further, even in case of occurrence of a crime, this enables the crime to be found immediately and dealt with in a prompt and appropriate manner. Furthermore, making a configuration capable of recording an image also allows the image to be used later as a clue and evidence for check and investigation of a situation of a crime, or for determination of a criminal.

Second Example Embodiment

A display system 1 according to a present example embodiment is similar to the above-described example embodiment except for a point that a configuration of controlling a timing for displaying a captured image on a display D1 is included.

<Function Configuration Example>

Figure 6:
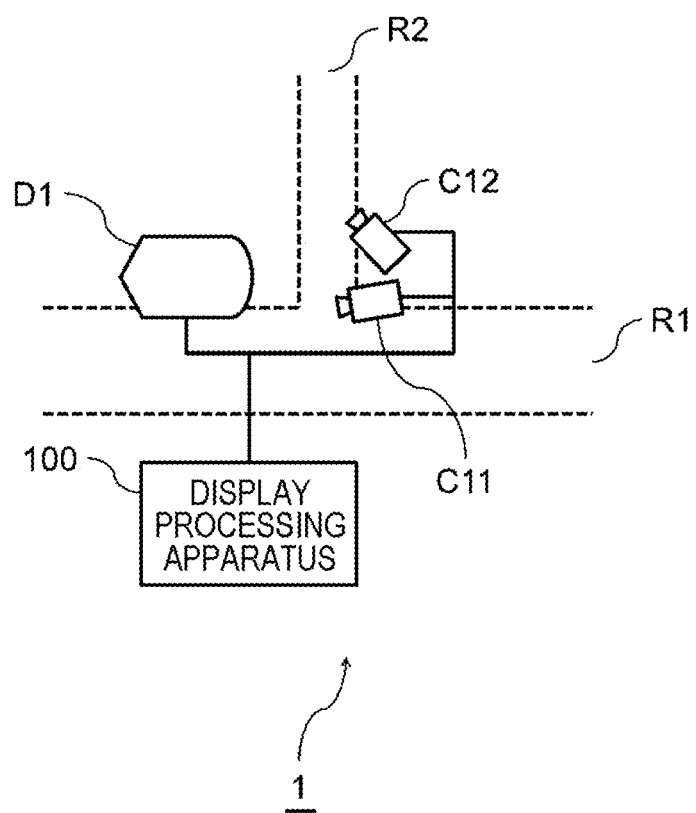
FIG. 6 is a diagram schematically illustrating a configuration example of a display system.
Figure 7:
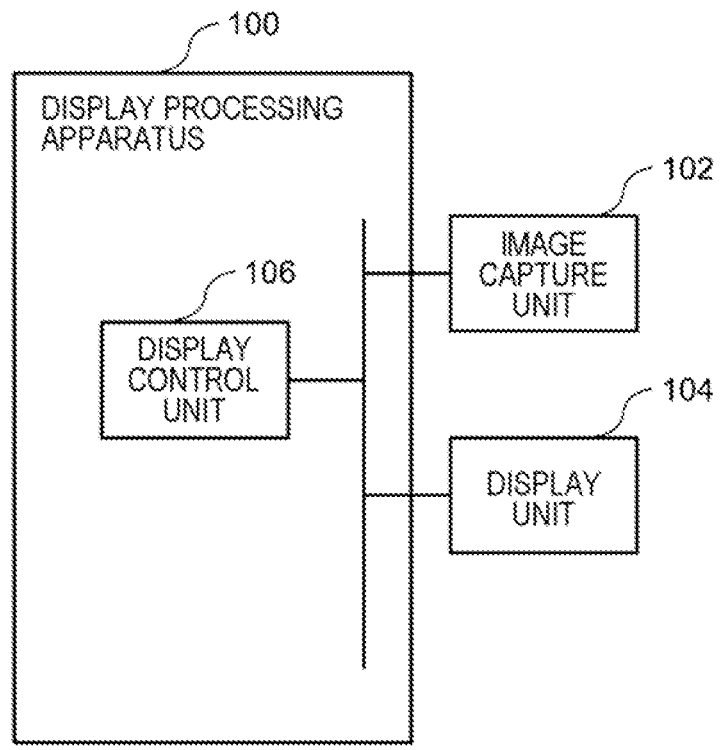
FIG. 7 is a function block diagram illustrating a logical configuration example of a display processing apparatus according to the present example embodiment.

FIG. 6 is a diagram schematically illustrating a configuration example of the display system 1. The display system 1 includes a display processing apparatus 100. FIG. 7 is a function block diagram illustrating a logical configuration example of the display processing apparatus 100 according to the present example embodiment. As described above, the display processing apparatus 100 is achieved by the computer 1000.

The image capture unit 102 includes a first camera C11 installed at an entrance of a second road R2 and a second camera C12 installed at a middle of the second road R2. Then, a display control unit 106 processes an image of the first camera C11, and causes a display unit 104 to display an image of the second camera C12 when entry of a person into the second road R2 is detected.

In the first example embodiment, the image capture unit 102 is the camera C1 and the display unit 104 is the display D1. Thus, an image of the image capture unit 102 (the camera C1) is displayed directly on the display unit 104 (the display D1). In other words, the image capture unit 102 (the camera C1) and the display unit 104 (the display D1) actively perform capturing of an image of the second road R2, transmission and reception of the captured image, and displaying of the image.

In the present example embodiment, the image capture unit 102 may include a function of causing at least one camera C1 to capture an image of the second road R2 and a function of acquiring a captured image from the camera C1. The display control unit 106 acquires a captured image of the camera C1 from the image capture unit 102 and causes the display unit 104 (the display D1) to display the captured image. In other words, the camera C1 may passively operate under control of the image capture unit 102, and the display D1 may passively operate under control of the display control unit 106.

The second camera C12 is installed at a middle of the second road R2, and captures an image of the second road R2. The first camera C11 photographs an entrance of the second road R2 at all times. An image of the first camera C11 may not be displayed on the display D1. An image of the first camera C11 is used at least for detection of entry of a person into the second road R2. When no person exists on the second road R2, the second camera C12 may stop photographing, or may photograph the second road R2.

An image capture range of the first camera C11 is an entrance of the second road R2. An image captured with the first camera C11 is transmitted to, for example, the image processing apparatus 120 in FIG. 18. The image processing apparatus 120 detects a person existing within an image, determines a moving direction of the detected person with respect to the second road R2, and detects entry of the person into the second road R2.

In the present example embodiment, an image of the second camera C12 is not displayed on the display D1 until existence of a person on the second road R2 is detected. Another image, for example, a content such as an advertisement or notification information may be displayed on the display D1.

When entry of a person into the second road R2 is detected, the display control unit 106 causes to start photographing when the second camera C12 stops photographing. Then, the display control unit 106 causes the display D1 to display an image of the second camera C12.

<Operation Example>

Figure 8:
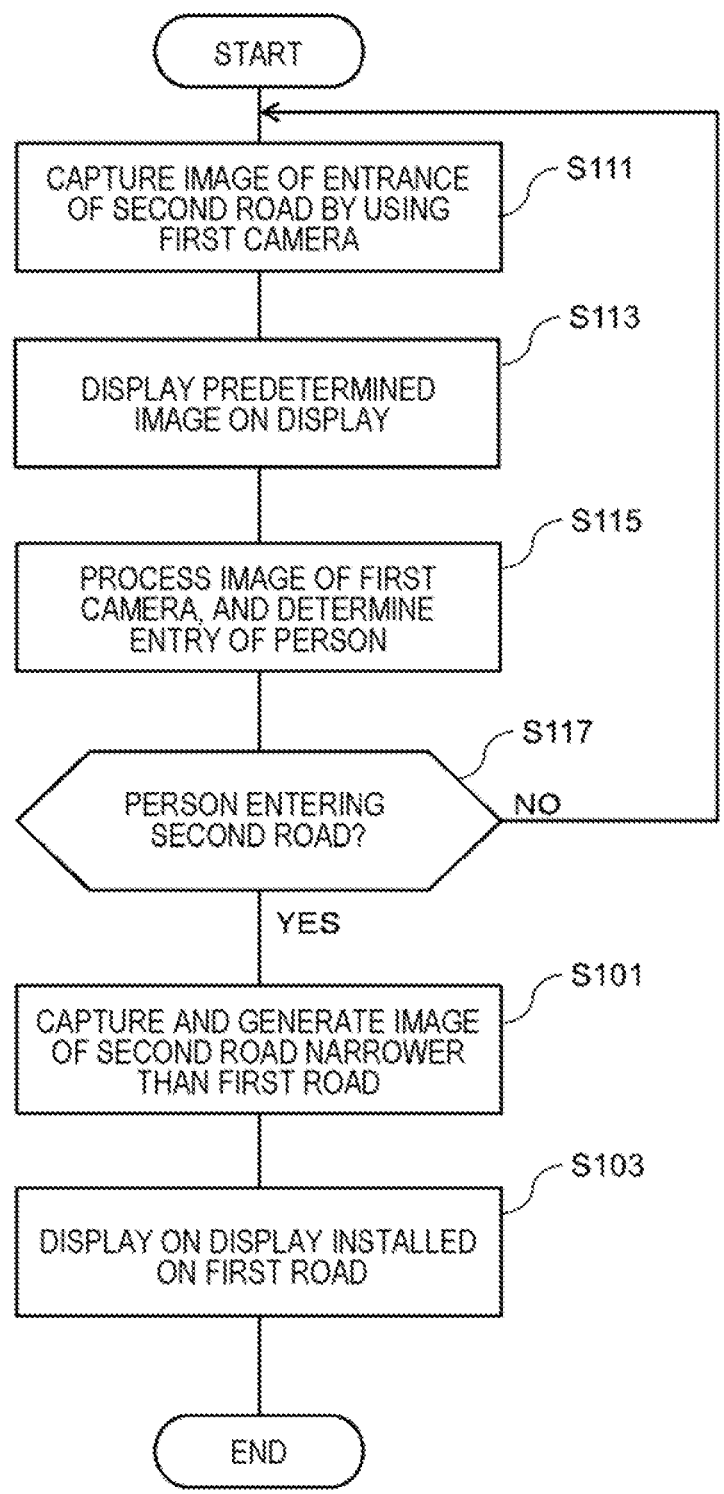
FIG. 8 is a flowchart illustrating an operation example of the display system.

FIG. 8 is a flowchart illustrating an operation example of the display system 1. The present figure includes Steps S101 and S103 that are the same as the flowchart in FIG. 5, and further includes Steps S111 to S117 prior to Step S101. However, in Step S103 in FIG. 5, the display unit 104 (the display D1 installed on the first road R1) mainly displays an image. The present figure is different in a point that an image is displayed by the display control unit 106 on the display D1 installed on the first road R1.

First, the image capture unit 102 causes the first camera C11 to capture and generate an image of the second road R2 (Step S111). Capturing an image of the second road R2 by the first camera C11 may be performed at all times, or may be performed for at least a predetermined period of time. Further, the display control unit 106 causes the display D1 to display a predetermined image (Step S113). Examples of the predetermined image include, but not particularly limited to, an image other than a captured image of the second road R2, and may be, for example, various contents such as an advertisement video and notification information. However, the predetermined image may not be displayed on the display D1, and a screen of the display D1 may be turned off.

Then, the display control unit 106 acquires an image of the first camera C11 and causes the image processing apparatus 120 in FIG. 18 to process the acquired image, and determines entry of a person into the second road R2 by using a processing result (Step S115). Then, when entry of a person into the second road R2 is detected by the display control unit 106 (YES in Step S117), the processing proceeds to Step S101.

Then, the image capture unit 102 causes the second camera C12 to capture and generate an image of the second road R2 (Step S101). Then, the display control unit 106 acquires an image of the second camera C12, and causes the display D1 to display the image or display data using the image (Step S103). On the other hand, when entry of a person into the second road R2 is not detected (NO in Step S117), the processing returns to Step S111, and photographing the second road R2 by the first camera C11 and displaying a predetermined image on the display D1 in Step S113 are continued.

Furthermore, a timing for stopping displaying an image of the second road R2 captured by the second camera C12 on the display D1 is exemplified, but not particularly limited to, as follows. A plurality of following conditions (a1) to (a4) may be combined.

(a1) When exit of an already-entered person from the second road R2 is detected by processing a captured image of the first camera C11

(a2) When existence of a person is no longer detected within the second road R2 by processing a captured image of the second camera C12

(a3) After a lapse of a predetermined period of time from the start of photographing by the second camera C12

(a4) After a preliminarily determined time at which photographing is to be stopped comes The display control unit 106 stops displaying an image of the second road R2 captured by the second camera C12 on the display D1, and thereafter causes the display D1 to display a predetermined image. However, the predetermined image may not be displayed on the display D1, and a screen of the display D1 may be turned off.

According to the present example embodiment, entry of a person into the second road R2 can be detected by processing an image of the first camera C11 installed at an entrance of the second road R2, and a captured image of the second camera C12 can be displayed on the display D1 when a person enters the second road R2. This enables the display D1 to display a captured image of the second road R2 when a person enters the second road R2, and enables the display D1 to display another image, for example, a content such as an advertisement or notification information at other times. Therefore, only when monitoring is necessary, a captured image of the second road R2 can be displayed on the display D1 installed in a town for displaying a content such as an advertisement.

Third Example Embodiment

<Function Configuration Example>

Figure 9:
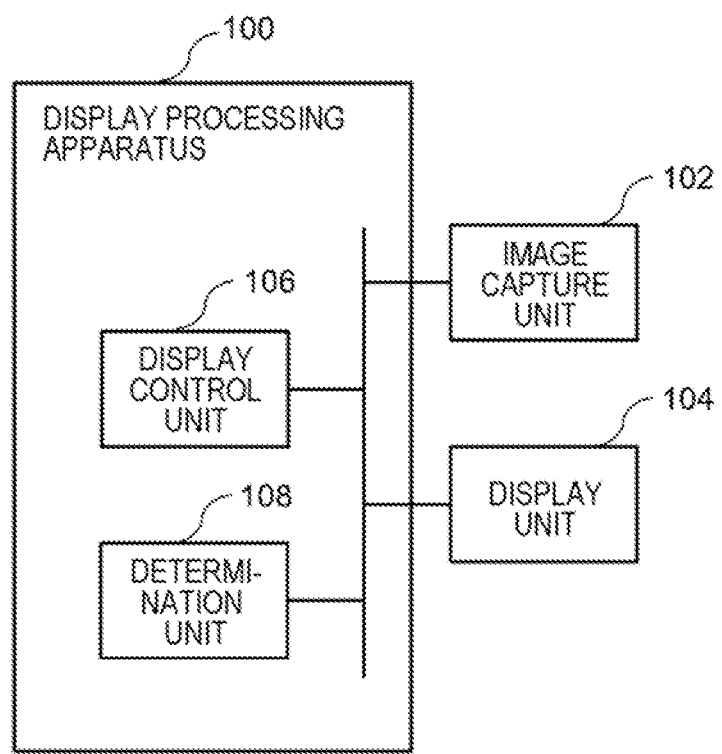
FIG. 9 is a function block diagram illustrating a logical configuration example of a display processing apparatus according to the present example embodiment.

FIG. 9 is a function block diagram illustrating a logical configuration example of a display processing apparatus 100 according to a present example embodiment. A display system 1 according to the present example embodiment is different from the above-described example embodiment regarding a condition for displaying an image of a second camera C12 on a display D1, but is similar to the above-described example embodiment except for the above.

The display processing apparatus 100 further includes a determination unit 108 in addition to the configuration of the display processing apparatus 100 in FIG. 7. The determination unit 108 processes an image of a first camera C11 and determines an attribute of a person. Then, a display control unit 106 causes the display D1 to display an image of the second camera C12 when the attribute satisfies a criterion.

Examples of the attribute of a person to be determined by the determination unit 108 are, for example, a gender and an age group. Examples of the criterion are, for example, that the gender is a female and that the age group is a child (for example, less than ten years old).

Alternatively, a feature value of a particular person may be registered in advance, and the particular person may be detected from a captured image by using the image processing apparatus 120 in FIG. 18. Examples of the particular person may include, for example, any of a person on the run, a person being tracked, a person on the wanted list, and a person to be guarded such as a very important person.

<Operation Example>

Figure 10:
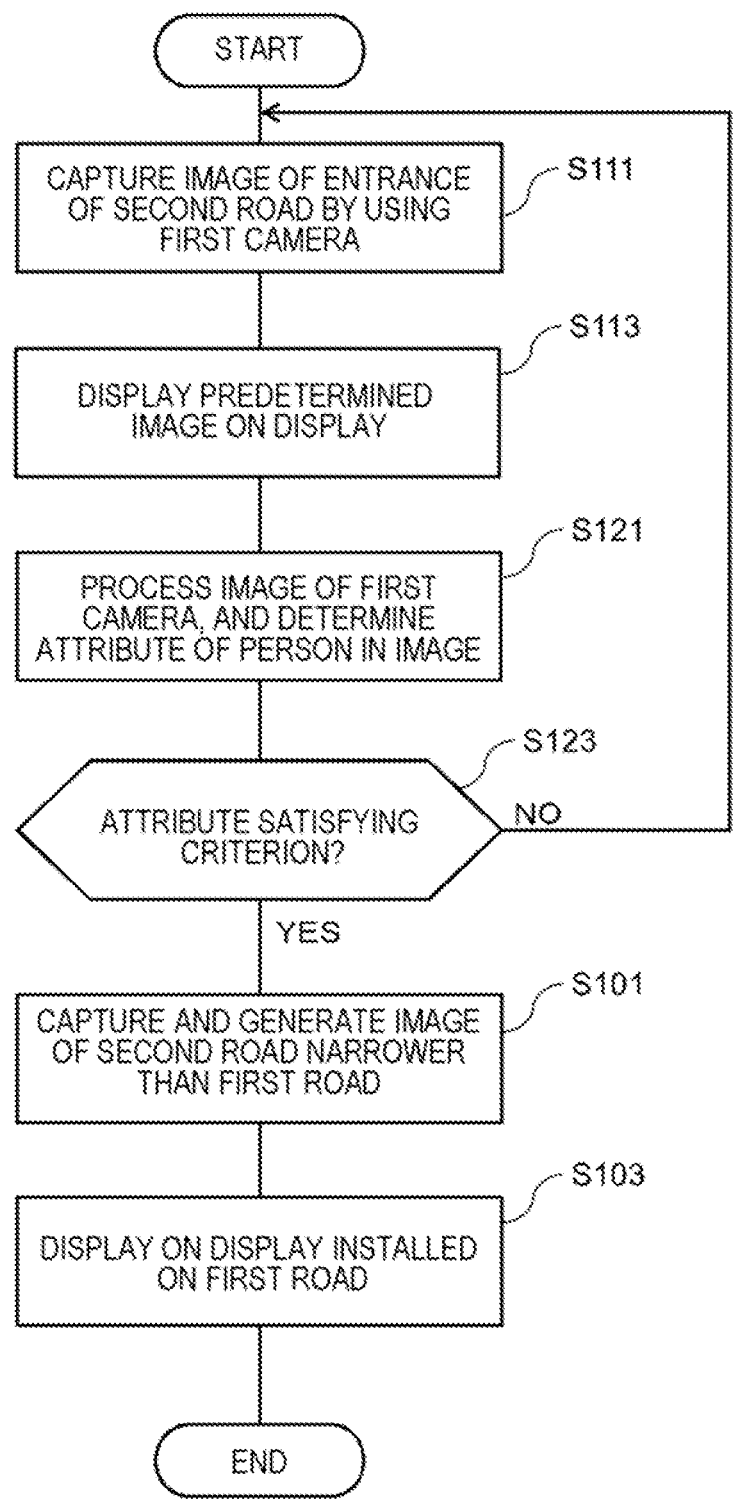
FIG. 10 is a flowchart illustrating an operation example of a display system.

FIG. 10 is a flowchart illustrating an operation example of the display system 1. The present figure includes Step S101 that is the same as the flowchart in FIG. 5 and Steps S103, S111, and S113 that are the same as the flowchart in FIG. 8, and further includes Steps S121 and S123 between Steps S113 and S101.

First, the image capture unit 102 causes the first camera C11 to capture and generate an image of the second road R2 (Step S111). The display control unit 106 causes the display D1 to display a predetermined image (Step S113). Then, the determination unit 108 acquires the image of the first camera C11 and causes the image processing apparatus 120 in FIG. 18 to process the acquired image, and determines an attribute of a person in the image by using a processing result (Step S121). Then, the display control unit 106 determines whether the attribute satisfies a preliminarily determined criterion, for example, whether the attribute is a female or a child (Step S123). When the attribute satisfies a criterion (YES in Step S123), the processing proceeds to Step S101.

Then, the image capture unit 102 causes the second camera C12 to capture and generate an image of the second road R2 (Step S101). Then, the display control unit 106 acquires an image of the second camera C12, and causes the display D1 to display the image or display data using the image (Step S103). On the other hand, when the attribute does not satisfy a preliminarily determined criterion (NO in Step S123), the processing returns to Step S111, and photographing the second road R2 by the first camera C11 and displaying a predetermined image on the display D1 in Step S113 are continued.

A timing for stopping displaying an image of the second road R2 captured by the second camera C12 on the display D1 is similar to the above-described example embodiment. The display control unit 106 stops displaying an image of the second road R2 captured by the second camera C12 on the display D1, and thereafter causes the display D1 to display a predetermined image. However, the predetermined image may not be displayed on the display D1, and a screen of the display D1 may be turned off.

According to the present example embodiment, an image of a camera can be displayed on a display when an attribute of a person having entered the second road R2 satisfies a criterion, and thus, a video of a place pertaining to a situation having a high incidence of crime can be displayed on a main street and can cause persons on the main street to monitor the place with watchful eyes. In comparison with a case of displaying a video at all times, it is expectable that a degree of attention to a video is more increased by displaying the video in a specific case.

Fourth Example Embodiment

Figure 11:
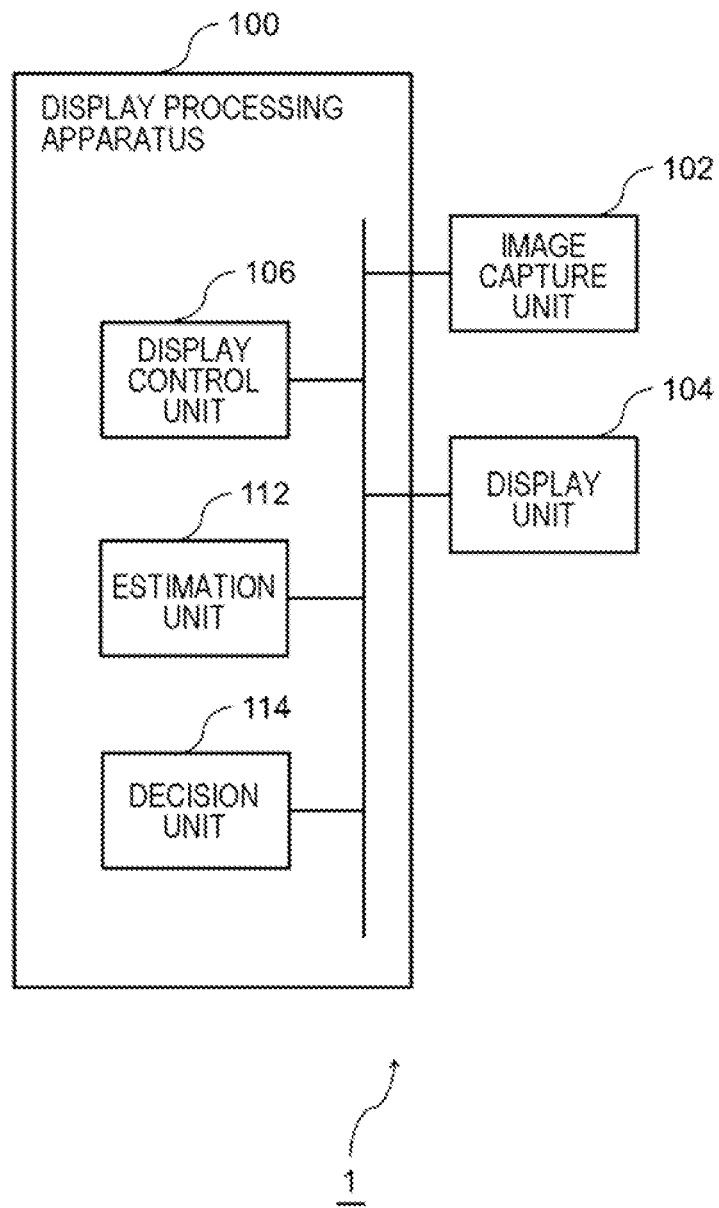
FIG. 11 is a function block diagram illustrating a logical configuration example of a display processing apparatus according to the present example embodiment.
Figure 12:
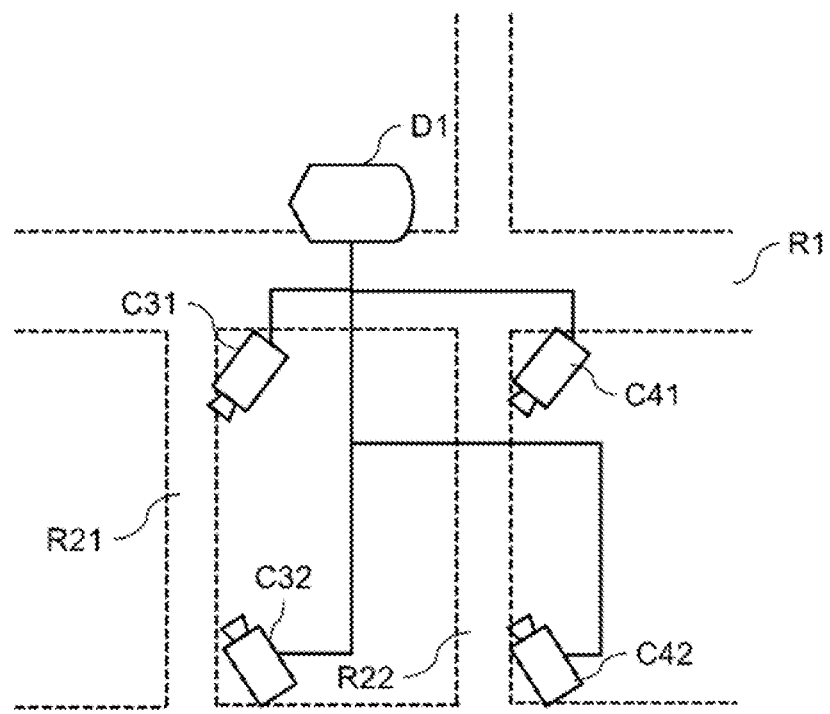
FIG. 12 is a diagram schematically illustrating an arrangement example of a display and a camera being installed on a second road to be monitored by a display system.

FIG. 11 is a function block diagram illustrating a logical configuration example of a display processing apparatus 100 according to a present example embodiment. FIG. 12 is a diagram schematically illustrating an arrangement example of a display D1 and a camera C1 being installed on a second road R2 to be monitored by a display system 1. The display processing apparatus 100 according to the present example embodiment is similar to the display processing apparatus 100 according to the above-described example embodiment in FIG. 7 except for a point that captured images of a plurality of second roads R2 are displayed on the single display D1. The display processing apparatus 100 according to the present example embodiment includes a configuration similar to the display processing apparatus 100 according to the above-described example embodiment in FIG. 7, and further includes an estimation unit 112 and a decision unit 114. However, the estimation unit 112 and the decision unit 114 according to the present example embodiment can be also combined with the configuration of the display processing apparatus 100 according to another example embodiment other than the example embodiment in FIG. 7, as far as no inconsistency occurs.

As illustrated in FIG. 12, a plurality of second roads, second roads R21 and R22 in the example, are associated with a single display unit 104 (the display D1). An image capture unit 102 includes a plurality of cameras being installed at an entrance and an exit of the second road R2, cameras C31 and C32 associated with the second road R21 and cameras C41 and C42 associated with the second road R22 in the example.

As in the display system 1 in FIG. 6, it is assumed, also in the present example embodiment, that a first camera for detecting entry of a person and a second camera for capturing an image of the second road are installed at each entrance and each exit. The two cameras form one pair, and each pair is illustrated by one reference sign in FIG. 12. For example, the camera C31 includes a first camera C11 and a second camera C12.

<Function Configuration Example>

The estimation unit 112 estimates the number of persons staying on each second road by processing images of a plurality of cameras. The decision unit 114 decides which road image to display on the display D1 by using the estimated number of persons.

The display D1 displays an image of at least one camera. A screen of the display D1 may be divided into pieces, and images of a plurality of cameras may be each displayed on each piece. The display D1 may switch and sequentially display images of a plurality of cameras at predetermined time intervals.

As described above, for an image to be used by the estimation unit 112 in estimation of the number of persons, a captured image of the first camera C11 installed at each position is used. For an image to be displayed on the display D1, a captured image of the second camera C12 installed at each position is used.

<Operation Example>

Figure 13:
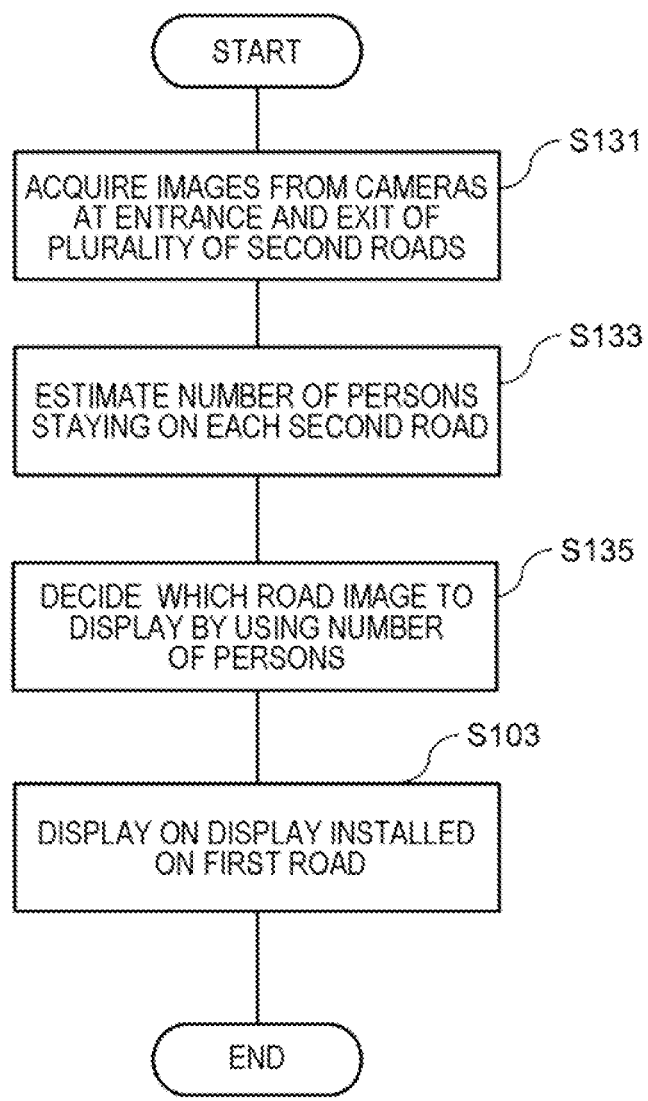
FIG. 13 is a flowchart illustrating an operation example of the display system.

FIG. 13 is a flowchart illustrating an operation example of the display system 1. The present figure includes Step S103 that is the same as the flowchart in FIG. 8, and further includes Steps S131 to S135 prior to Step S103.

First, the image capture unit 102 acquires, from the cameras C31, C32, C41, and C42 at an entrance and an exit of the plurality of second roads R21 and R22, an image in association with each road (Step S131). Herein, the image capture unit 102 acquires a captured image of the first camera C11 installed at each position.

Figure 14A:
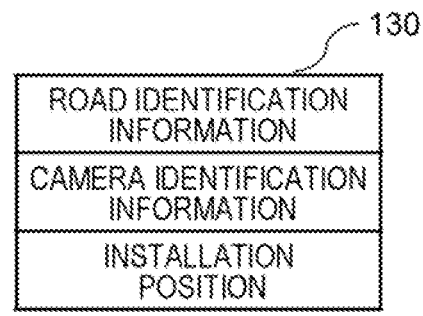
FIGS. 14A and 14B are diagrams each illustrating one example of a day data structure of camera information and image information.
Figure 14B:
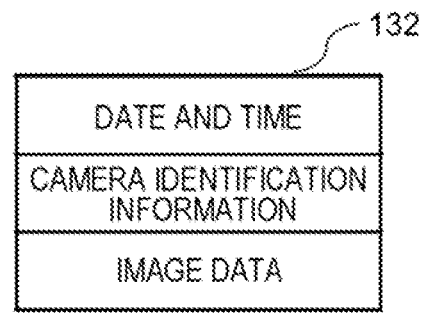

FIG. 14 is a diagram illustrating one example of a day structure of camera information and image information. FIG. 14A illustrates camera information 130, and FIG. 14B illustrates image information 132. The pieces of information are stored in the storage device 1040 of the computer 1000.

For each of a plurality of second roads, identification information is determined in advance. The camera information 130 includes road identification information of the second road, in association therewith, identification information of a camera installed on the second road, and information on an installation position of the camera. The information on the installation position may be information simply indicating an entrance or an exit of the second road, or may be information indicating an absolute position such as latitude and longitude. Alternatively, the information on the installation position may be information indicating an address, may be a name of the installation position such as, for example, a building name, a facility name, or an intersection name, or, when installing on a utility pole, may be identification information allocated to the utility pole.

The image information 132 includes a date and time of capturing an image, camera identification information, and, in association therewith, image data captured by each camera. In a captured image of each camera, identification information identifying each camera may be, for example, an internet protocol (IP) address allocated to each camera. The image information 132 may hold, as image data, a file name in which a path indicating a location where an image data file is temporarily or non-temporarily stored is included, or at least a file name. A substantial image data file may be accumulated in a predetermined storage location. Further, date and time information may be absent when included in image data themselves.

Returning to FIG. 13, the estimation unit 112 acquires an image of the first camera C11 installed at a plurality of positions and causes the image processing apparatus 120 in FIG. 18 to process the acquired image, and estimates the number of persons staying on each second road by using a processing result (Step S133). Specifically, a person passing through an entrance and an exit of the second road is image-recognized by the image processing apparatus 120. As a simplest method, entering and leaving of a person at each entrance and each exit is detected, and a people counter is incremented when an entering person is detected and is decremented when a leaving person is detected. Alternatively, the number of entering persons and the number of leaving persons may be counted for each entrance and each exit of the second road, and a difference may be calculated to determine the number of persons staying on the second road.

In another method, first, a person entering the second road is image-recognized by the image processing apparatus 120, and a feature value of the person is registered, as an entering person, in an entering-person list. At this time, a people counter may be incremented. Then, a person leaving the second road is image-recognized by the image processing apparatus 120, whether a feature value of the person is registered as an entering person is determined, and, when registered, the feature value is deleted from the entering-person list. At this time, a people counter may be decremented. Alternatively, the number of persons may be acquired by counting the number of persons registered in the entering-person list.

When the leaving person is not included in the entering-person list, no operation is performed. Alternatively, a feature value of the person, a date and time of leaving, identification information of an image capture camera, and the like may be recorded as a person whose entry is unknown.

Then, the decision unit 114 decides which road image to display on the display D1 by using the number of persons estimated in Step S133 (Step S135). Then, the display control unit 106 causes the display D1 to display the determined image (Step S103).

Various methods of displaying an image are conceivable and are exemplified, but not limited to, as follows.

(b1) A screen of the display D1 is divided into a plurality of areas, and captured images or display data of a plurality of cameras are each displayed on each area.

(b2) Captured images or display data of a plurality of cameras are sequentially displayed, each for a predetermined period of time, on the whole screen of the display D1, each area of the divided screen, and at least a partial region of the screen of the display D1.

(b3) When a specific condition is satisfied, a captured image or display data satisfying the condition are displayed, as a pop-up screen, on at least a partial region of the screen of the display D1.

(b4) A period of time for one display of each image or display data is fixed or changed according to a condition.

(b5) An image to be displayed on each screen or region is selectively displayed by switching, according to a condition, between a captured image or display data of a camera and an image other than the captured image or display data, for example, a content such as an advertisement or notification information.

(b6) When a specific condition is satisfied, a captured image or display data of a specific camera are emphatically displayed.

(b7) A camera is given priority, and displaying is performed a captured image or display data are displayed in descending order of the priority or displayed for an elongated period of display time.

(b8) Captured images of a plurality of cameras are displayed at random.

(b5) An image to be displayed on each screen or region is selectively displayed by switching, according to a condition, between a captured image or display data of a camera and an image other than the captured image or display data, for example, a content such as an advertisement or notification information.

(b6) When a specific condition is satisfied, a captured image or display data of a specific camera are emphatically displayed.

(b7) A camera is given priority, and displaying is performed in descending order of the priority or displayed for an elongated period of display time.

(b8) Captured images of a plurality of cameras are displayed at random.

Various methods of deciding priority of an image to be displayed are conceivable and are exemplified, but not limited to, as follows.

(c1) When the number of persons staying on the second road is larger than a predetermined number of persons, the priority is lowered.

(c2) When the number of persons staying on the second road is one, the priority is lowered.

(c3) When the number of persons staying on the second road is within a reference range (for example, two to three), the priority is raised.

The priority may be indicated, for example, at a rate of 0 to 1. The priority indicates a degree of priority for displaying a captured image of the camera on the display D1. In other words, the priority indicates that an image being captured by the camera includes a situation having a higher incidence of crime. Herein, a higher numerical value of the priority is prioritized, that is, indicates a higher crime incidence. However, the priority may be 0 to 100, or may be indicated by a predetermined level such as low/medium/high or 1 to 5.

A captured image of a camera having a priority equal to or more than a threshold value may be preferentially displayed, displayed in descending order of the priority, or displayed for an elongated period of time for a higher priority. A captured image of a camera having a priority less than a threshold value may not be displayed.

Figure 15A:
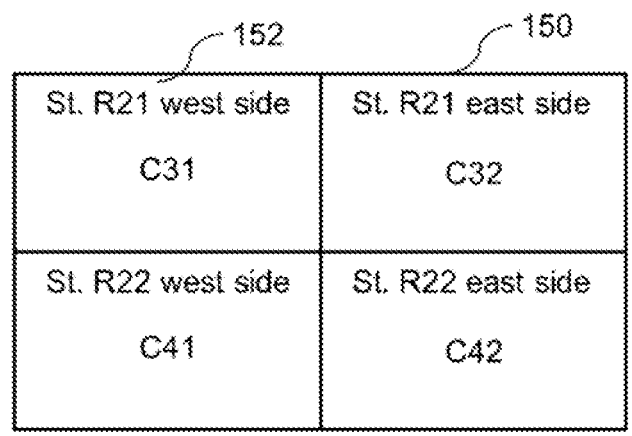
FIGS. 15A and 15B are diagrams each illustrating an example of a display screen of a display.

FIG. 15 is a diagram illustrating an example of a display screen of the display D1. FIG. 15A illustrates an example of a screen 150 that is divided into four areas in each of which a captured image of four cameras is displayed. In each area, information 152 indicating an image-photographing place may be displayed together with a captured image.

Figure 15B:
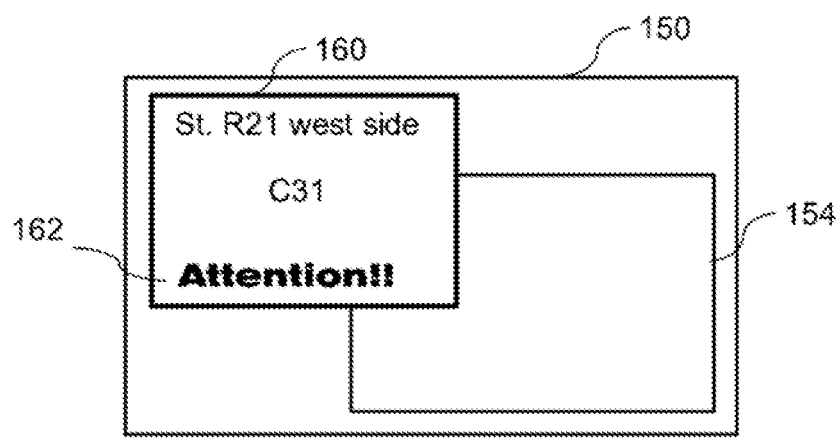

FIG. 15B illustrates an example of the screen 150 of the display D1 in which an image of a camera having a priority exceeding a threshold value is displayed in a partial region 160 and another content image such as an advertisement other than a captured image of a camera is displayed in another region 154. In the region 160, character information, an image 162, or the like indicating a message for calling attention may be further displayed. Alternatively, display for calling more attention may be performed by emphasizing or blinking a frame of the region 160, displaying an animation in a superimposed manner, or the like.

According to the present example embodiment, captured images of a plurality of cameras can be selectively displayed on the display D1 according to a priority of a camera, and thus, a captured image of a camera installed at a place in a situation having a high incidence of crime can be preferentially displayed on the display D1. Therefore, more effective crime prevention can be expected.

While the example embodiments of the present invention have been described with reference to the drawings, the example embodiments are illustrative of the present invention, and various configurations other than the above may be employed.

For example, a condition for displaying an image generated by the image capture unit 102 on the display D1 may be specific time, ambient brightness equal to or less than a criterion value, or the like. The display control unit 106 displays an image captured by the image capture unit 102 on the display D1 when a predetermined condition is satisfied.

The display processing apparatus 100 may further include a time acquisition unit (not illustrated) that acquires current time. The time acquisition unit may acquire current time from a clock (not illustrated) included in the computer 1000, or may acquire current time from a network time protocol (NTP) server via a communication network.

A period of time for display may be set in advance. Further, a period of time for display may be changeable in setting by an operation of an administrator. For example, a period of time from evening to dawn may be set. An hour in which the second road R2 becomes unfrequented, an hour in which public security is poor even when the second road R2 is frequented, or the like may be specified. Further, display on the display D1 may be stopped in an hour in which the first road R1 becomes unfrequented. In other words, the display unit 104 displays an image in an hour other than an hour in which the first road R1 becomes unfrequented.

The ambient brightness can be estimated by processing an image generated by the image capture unit 102. When the estimated ambient brightness is dark, that is, equal to or less than a criterion, an image of the image capture unit 102 is displayed on the display D1. Alternatively, the ambient brightness may be acquired from information measured by the camera C1 during photographing.

Figure 16:
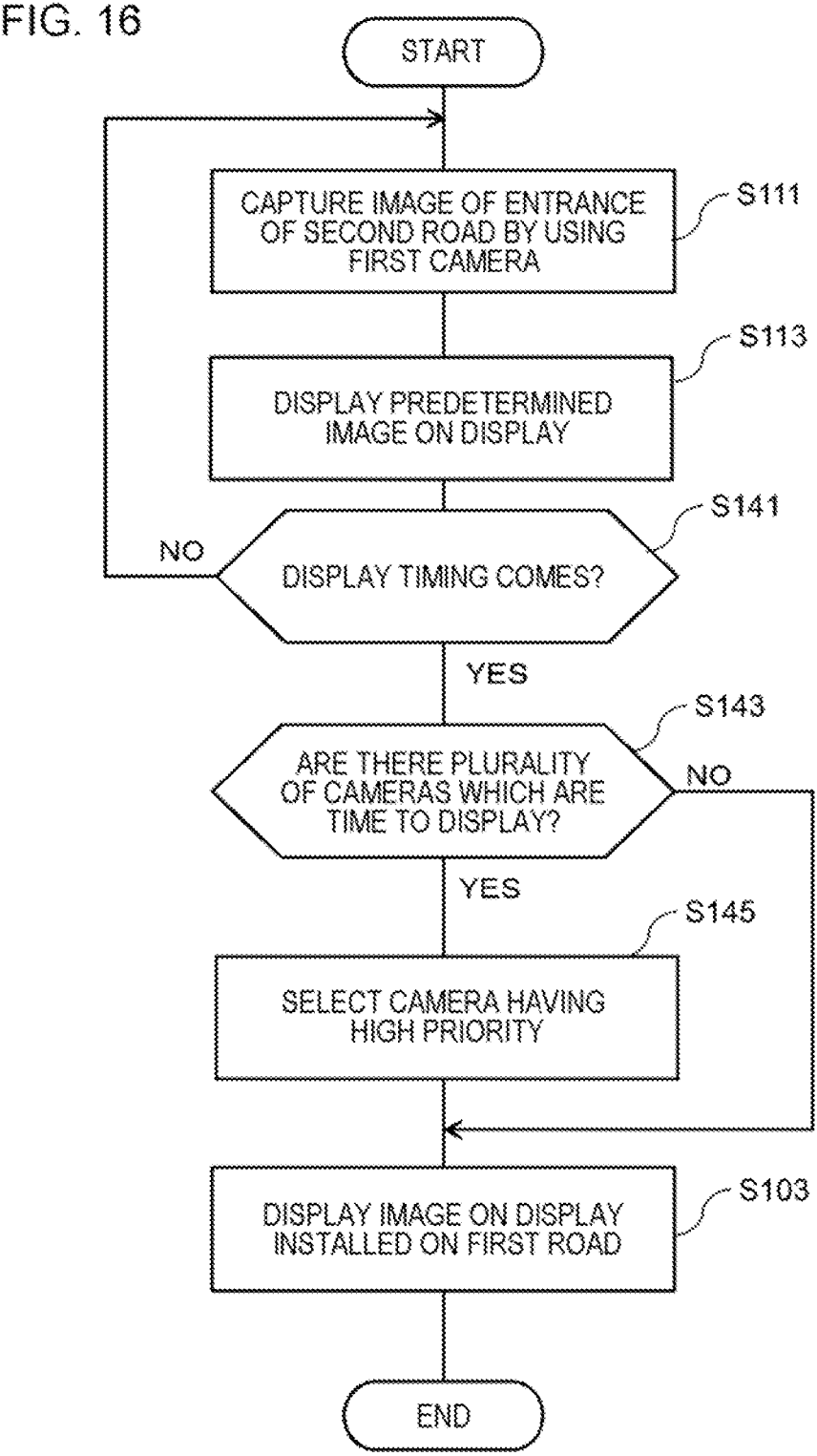
FIG. 16 is a flowchart illustrating an operation example of the display system.

An example in which the conditions are combined with the above-described example embodiment will be described. FIG. 16 is a flowchart illustrating an operation example of the display system 1. The flowchart in FIG. 16 includes Steps S111, S113, and S103 in the flowchart in FIG. 8, and further includes Steps S141 to S145.

First, the image capture unit 102 causes the first camera C11 to capture and generate an image of the second road R2 (Step S111). The display control unit 106 causes the display D1 to display a predetermined image (Step S113). Then, the display control unit 106 determines whether a display timing has come for each camera (Step S141). The determination condition is, for example, at least any one of a case in which an attribute of a person entering the second road R2 satisfies a criterion (a female, a child, or the like), a case in which specific time comes, and a case in which ambient brightness is equal to or less than a criterion.

Then, when a display timing has come (YES in Step S141) and when there are a plurality of cameras at the display timing (YES in Step S143), the display control unit 106 selects a camera having a high priority (Step S145) and causes the display D1 to display (Step S103).

When a display timing has not come (NO in Step S141), the processing returns to Step S111. Further, when there is one camera at a display timing (NO in Step S143), Step S145 is bypassed, and the display control unit 106 causes the display D1 to display a captured image of the camera (Step S103).

Figure 17:
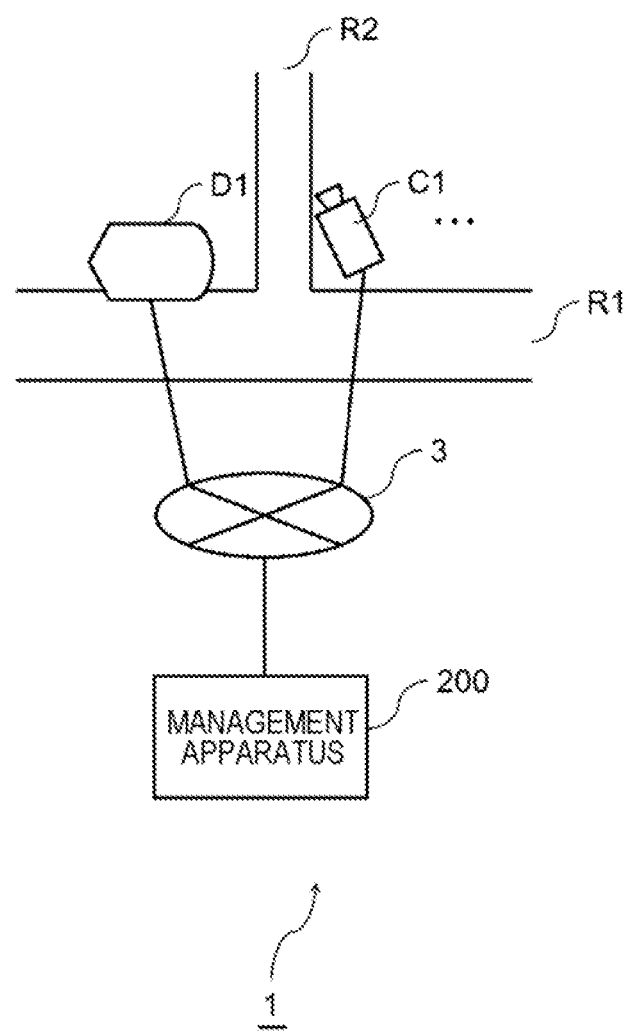
FIG. 17 is a diagram illustrating a configuration example of a display system according to another example embodiment.

In the above-described example embodiment, a configuration in which a camera and a display are directly connected has been described. In another example embodiment, a camera and a display may be connected via a management apparatus 200 such as a monitoring center. FIG. 17 is a diagram illustrating a configuration example of a display system 1 according to another example embodiment. The display system 1 includes a plurality of cameras C1, a display D1, and the management apparatus 200. The management apparatus 200 is connected to the plurality of cameras C1 and the display D1 via a communication network 3 such as the Internet. The display processing apparatus 100 described in the above-described example embodiment may be included in the management apparatus 200.

FIG. 18 is a diagram illustrating a configuration example of a display system 1 including an image processing apparatus 120. In the example, the display system 1 includes a display D1, at least one camera C1, a display processing apparatus 100, and the image processing apparatus 120. The apparatuses are connected to each other via a communication network 3.

This configuration enables detecting entry of a person into the second road R2, determining an attribute of an entering person, and acquiring a feature value of a person, by performing image processing by the image processing apparatus 120 on an image captured with the camera C1.

In the above-described example embodiment, the configuration of the display system 1 including the single display D1 has been described, but, without limitation thereto, the display system 1 may include a plurality of displays.

For example, when occurrence of a crime is detected, a moving direction of a person to be tracked is determined, and an image of a camera capturing the person is displayed on a display in the moving direction. As a method of detecting occurrence of a crime, detection using image processing by the image processing apparatus 120 is possible. Alternatively, information on a crime occurrence place may be acquired in conjunction with a predetermined alarm system, and a camera and a display may be determined from the positional information.

In the example, it is preferred that the display control unit 106 causes a display to display a captured image of a camera capturing an image of a place where a crime occurs and a place where a person to be tracked exists.

While the present invention has been described with reference to the example embodiments and the examples, the present invention is not limited to the above-described example embodiments and the examples. Various modifications that can be understood by those skilled in the art can be made to the configurations and details of the present invention within the scope of the present invention.

Note that, acquisition and usage of information relating to a user shall be performed in a lawful manner in the present invention.

The whole or part of the above-described example embodiments can be described as, but not limited to, the following supplementary notes.

1. A display system including:
    a display unit that is installed on a first road; and
    an image capture unit that captures an image of a second road being narrower than the first road, wherein
    the display unit acquires and displays an image generated by the image capture unit or a display data using the image.
2. The display system according to supplementary note 1, wherein
    the image capture unit captures an image of the second road intersecting with the first road.
3. The display system according to supplementary note 1 or 2, wherein
    the image capture unit captures an image of the second road connecting to the first road via a third road.
4. The display system according to any one of supplementary notes 1 to 3, wherein
    the image capture unit includes
    a first camera installed at an entrance of the second road, and
    a second camera installed at a middle of the second road, the display system further including
    a display control unit that processes an image of the first camera, and causes the display unit to display an image of the second camera when entry of a person into the second road is detected.
5. The display system according to supplementary note 4, further including
    a determination unit that processes an image of the first camera, and determines an attribute of a person, wherein
    the display control unit causes the display unit to display an image of the second camera when the attribute satisfies a criterion.
6. The display system according to any one of supplementary notes 1 to 5, wherein
    the display control unit causes the display unit to display the image at a specific time.
7. The display system according to any one of supplementary notes 1 to 6, wherein
    the display control unit causes the display unit to display the image when ambient brightness is equal to or less than a criterion.

8. The display system according to any one of supplementary notes 1 to 7, wherein
a plurality of the second roads are associated with the single display unit, and
the image capture unit includes a plurality of cameras being installed at an entrance and an exit of the second road,
the display system further including:
an estimation unit that estimates a number of persons staying on each of the second roads by processing images of the plurality of cameras; and
a decision unit that decides which road image to display on the display unit, by using the estimated number of persons.

9. A display processing apparatus including
a display control unit that acquires an image generated by an image capture unit that captures an image of a second road being narrower than a first road on which a display is installed or a display data using the image, and causes the display to display the image or the display data.

10. The display processing apparatus according to supplementary note 9, wherein
the image capture unit captures an image of the second road intersecting with the first road.

11. The display processing apparatus according to supplementary note 9 or 10, wherein
the image capture unit captures an image of the second road connecting to the first road via a third road.

12. The display processing apparatus according to any one of supplementary notes 9 to 11, wherein
the image capture unit includes
a first camera installed at an entrance of the second road, and
a second camera installed at a middle of the second road, and
the display control unit
processes an image of the first camera, and further causes the display unit to display an image of the second camera when entry of a person into the second road is detected.

13. The display processing apparatus according to supplementary note 12, further including
a determination unit that processes an image of the first camera, and determines an attribute of a person, wherein
the display control unit causes the display unit to display an image of the second camera when the attribute satisfies a criterion.

14. The display processing apparatus according to any one of supplementary notes 9 to 13, wherein
the display control unit causes the display unit to display the image at a specific time.

15. The display processing apparatus according to any one of supplementary notes 9 to 14, wherein
the display control unit causes the display unit to display the image when ambient brightness is equal to or less than a criterion.

16. The display processing apparatus according to any one of supplementary notes 9 to 15, wherein
a plurality of the second roads are associated with the single display unit, and
the image capture unit includes a plurality of cameras being installed at an entrance and an exit of the second road,
the display processing apparatus further including:
an estimation unit that estimates a number of persons staying on each of the second roads by processing images of the plurality of cameras; and
a decision unit that decides which road image to display on the display unit by using the estimated number of persons.

17. A display processing method including:
by a display processing apparatus,
acquiring an image generated by an image capture unit that captures an image of a second road being narrower than a first road on which a display is installed, or a display data using the image; and
causing the display to display the image or the display data.

18. The display processing method according to supplementary note 17, wherein
the image capture unit captures an image of the second road intersecting with the first road.

19. The display processing method according to supplementary note 17 or 18, wherein
the image capture unit captures an image of the second road connecting to the first road via a third road.

20. The display processing method according to any one of supplementary notes 17 to 19, wherein
the image capture unit includes
a first camera installed at an entrance of the second road, and
a second camera installed at a middle of the second road,
the display processing method further including,
by the display processing apparatus,
processing an image of the first camera, and further causing the display unit to display an image of the second camera when entry of a person into the second road is detected.

21. The display processing method according to supplementary note 20, further including:
by the display processing apparatus,
processing an image of the first camera, and determining an attribute of a person; and
causing the display unit to display an image of the second camera when the attribute satisfies a criterion.

22. The display processing method according to any one of supplementary notes 17 to 21, further including,
by the display processing apparatus,
causing the display unit to display the image at a specific time.

23. The display processing method according to any one of supplementary notes 17 to 22, further including,
by the display processing apparatus,
causing the display unit to display the image when ambient brightness is equal to or less than a criterion.

24. The display processing method according to any one of supplementary notes 17 to 23, wherein
a plurality of the second roads are associated with the single display unit, and
the image capture unit includes a plurality of cameras being installed at an entrance and an exit of the second road,
the display processing method further including:
by the display processing apparatus,
estimating a number of persons staying on each of the second roads by processing an image of the plurality of cameras; and
deciding which road image to display on the display unit, by using the estimated number of persons.

25. A program for causing a computer to execute:
a procedure of acquiring an image generated by an image capture unit that captures an image of a second road being narrower than a first road on which a display is installed, or a display data using the image; and
a procedure of causing the display to display the image or the display data.

26. The program according to supplementary note 25, the program for further causing a computer to execute a procedure of causing the image capture unit to capture an image of the second road intersecting with the first road.

27. The program according to supplementary note 25 or 26, the program for further causing a computer to execute a procedure of causing the image capture unit to capture an image of the second road connecting to the first road via a third road.

28. The program according to any one of supplementary notes 25 to 27, wherein the image capture unit includes a first camera installed at an entrance of the second road, and a second camera installed at a middle of the second road, the program for further causing a computer to execute a procedure of processing an image of the first camera, and further causing the display unit to display an image of the second camera when entry of a person into the second road is detected.

29. The program according to supplementary note 28, the program for further causing a computer to execute:

a procedure of processing an image of the first camera, and determining an attribute of a person; and a procedure of causing the display unit to display an image of the second camera when the attribute satisfies a criterion.

30. The program according to any one of supplementary notes 25 to 29, the program for further causing a computer to execute a procedure of causing the display unit to display the image at a specific time.

31. The program according to any one of supplementary notes 25 to 30, the program for further causing a computer to execute a procedure of causing the display unit to display the image when ambient brightness is equal to or less than a criterion.

32. The program according to any one of supplementary notes 25 to 31, wherein a plurality of the second roads are associated with the single display unit, and the image capture unit includes a plurality of cameras being installed at an entrance and an exit of the second road, the program for further causing a computer to execute:

a procedure of estimating a number of persons staying on each of the second roads by processing an image of the plurality of cameras; and a procedure of deciding which road image to display on the display unit, by using the estimated number of persons.

What is claimed is:

1. A display system comprising:
a plurality of display units installed on a first road and respectively associated with a plurality of second roads narrower than the first road;
an image capture unit comprising a plurality of cameras installed at entrances and exits of the second roads;
an estimation unit that estimates a number of persons on each of the second roads by processing images captured by the plurality of cameras;
a display control unit that:
acquires the images captured by the plurality of cameras or display data using the images;
determines a moving direction of a target person when detecting the target person to be tracked from the images by processing the images; and
causes, from among the plurality of display units, a display unit in the moving direction to display the images captured by the plurality of cameras or the display data; and
a decision unit that:
determines how the display unit in the moving direction is to display the images by using the estimated number of persons; and
determines a priority of each of the plurality of cameras in accordance with at least one of:
when the number of persons is larger than a predetermined number of persons, the priority is lowered,
when the number of persons is one, the priority is lowered, and
when the number of persons is within a reference range, the priority is raised, wherein
the display unit in the moving direction displays the images in descending order of priority.

2. The display system according to claim 1, wherein
the image capture unit captures the images of at least one of the second roads intersecting the first road.

3. The display system according to claim 1, wherein
the image capture unit captures the images of at least one of the second roads connected to the first road via a third road.

4. The display system according to claim 1, wherein
the plurality of cameras include:
a first camera installed at an entrance of one of the second roads; and
a second camera installed at a middle of the one of the second roads, and the display control unit processes an image captured by the first camera, and causes the display unit in the moving direction to display an image captured by the second camera when entry of the target person on the second road is detected.

5. The display system according to claim 4, further comprising
a determination unit that processes the image captured by the first camera, and determines an attribute of the target person, wherein
the display control unit causes the display unit in the moving direction to display the image captured by the second camera when the attribute satisfies a criterion.

6. The display system according to claim 1, wherein
the display control unit causes the display unit in the moving direction to display the images at a specific time.

7. The display system according to claim 1, wherein
the display control unit causes the display unit in the moving direction to display the images when ambient brightness is equal to or less than a criterion.

8. A display processing method performed by a computer and comprising:
acquiring images captured by a plurality of cameras of an image capture unit that are installed at entrances of second roads narrower than a first road on which a plurality of display units are installed, or display data using the images;
estimating a number of persons on each of the second roads by processing images captured by the plurality of cameras;
determining a moving direction of a target person when detecting the target person to be tracked from the image by processing the image; causing, from among the plurality of display units, a display unit in the moving direction to display the images captured by the plurality of cameras or the display data;
determining how the display unit in the moving direction is to display the images by using the estimated number of persons; and
determining a priority of each of the plurality of cameras in accordance with at least one of:
when the number of persons is larger than a predetermined number of persons, the priority is lowered,
when the number of persons is one, the priority is lowered, and
when the number of persons is within a reference range, the priority is raised, wherein
the display unit in the moving direction displays the images in descending order of priority.

9. The display processing method according to claim 8, wherein
the image capture unit captures the images of at least one of the second roads intersecting the first road.

10. The display processing method according to claim 8, wherein
the image capture unit captures the images of at least one of the second roads connected to the first road via a third road.

11. The display processing method according to claim 8, wherein
plurality of cameras include:
a first camera installed at an entrance of one of the second roads; and
a second camera installed at a middle of the one of the second roads, and
the display processing method further comprising:
processing an image captured by the first camera, and further causing the display unit in the moving direction to display an image captured by the second camera when entry of the target person on the second road is detected.

12. The display processing method according to claim 11, further comprising:
processing the image captured by the first camera, and determining an attribute of the target person; and
causing he display unit in the moving direction to display the image captured by the second camera when the attribute satisfies a criterion.

13. The display processing method according to claim 8, further comprising:
causing the display unit in the moving direction to display the images at a specific time.

14. The display processing method according to claim 8, further comprising:
causing the display unit in the moving direction to display the images when ambient brightness is equal to or less than a criterion.

15. A non-transitory computer-readable storage medium storing a program executable by a computer to perform processing comprising:
acquiring images captured by a plurality of cameras of generated by an image capture unit that are installed at entrances of second roads narrower than a first road on which a plurality of display units are installed, or display data using the images;
estimating a number of persons on each of the second roads by processing images captured by the plurality of cameras;
determining a moving direction of a target person when detecting the target person to be tracked from the image by processing the image;
causing, from among the plurality of display units, a display unit in the moving direction to display the images captured by the plurality of cameras or the display data;
determining how the display unit in the moving direction is to display the images by using the estimated number of persons; and
determining a priority of each of the plurality of cameras in accordance with at least one of
when the number of persons is larger than a predetermined number of persons, the priority is lowered,
when the number of persons is one, the priority is lowered, and
when the number of persons is within a reference range, the priority is raised, wherein
the display unit in the moving direction displays the images in descending order of priority.

16. The non-transitory computer-readable storage medium according to claim 15, wherein
the image capture unit captures the images of at least one of the second roads intersecting the first road.

17. The non-transitory computer-readable storage medium according to claim 15, wherein
the image capture unit captures the images of at least one of the second roads connected to the first road via a third road.

18. The non-transitory computer-readable storage medium according to claim 15, wherein
the plurality of cameras include:
a first camera installed at an entrance of one of the second roads; and
a second camera installed at a middle of the one of the second roads, and
the display processing method further comprising:
the processing further comprises:
processing an image captured by the first camera, and further causing the display unit in the moving direction to display an image captured by the second camera when entry of the target person on the second road is detected.

* * * * *